(12) United States Patent
Zhou et al.

(10) Patent No.: US 11,239,501 B2
(45) Date of Patent: Feb. 1, 2022

(54) LITHIUM-ION BATTERY

(71) Applicant: CONTEMPORARY AMPEREX TECHNOLOGY CO., LIMITED, Ningde (CN)

(72) Inventors: Xiang Zhou, Ningde (CN); Xiaomei Liu, Ningde (CN); Shipeng Li, Ningde (CN); Jiang Liu, Ningde (CN); Guobao Wang, Ningde (CN)

(73) Assignee: CONTEMPORARY AMPEREX TECHNOLOGY CO., LIMITED, Fujian Province (CN)

( * ) Notice: Subject to any disclaimer, the term of this patent is extended or adjusted under 35 U.S.C. 154(b) by 144 days.

(21) Appl. No.: 16/562,114

(22) Filed: Sep. 5, 2019

(65) Prior Publication Data

US 2020/0091558 A1      Mar. 19, 2020

(30) Foreign Application Priority Data

Sep. 13, 2018   (CN) .......................... 201811068056.5

(51) Int. Cl.
*H01M 10/0569*      (2010.01)
*H01M 10/0525*      (2010.01)
(Continued)

(52) U.S. Cl.
CPC ....... *H01M 10/0569* (2013.01); *H01M 4/133* (2013.01); *H01M 4/136* (2013.01);
(Continued)

(58) Field of Classification Search
CPC ....... H01M 10/0525; H01M 2300/017; H01M 2300/004; H01M 2300/0028;
(Continued)

(56) References Cited

U.S. PATENT DOCUMENTS

| 2002/0061446 A1 | 5/2002 | Gan et al. |
| 2016/0172665 A1 | 6/2016 | Zhou et al. |
| 2016/0351888 A1* | 12/2016 | Wietelmann ...... H01M 10/0569 |

FOREIGN PATENT DOCUMENTS

| CN | 101609908 A | * 12/2009 |
| CN | 104247136 A | 12/2014 |

(Continued)

OTHER PUBLICATIONS

Logan, E. R., et al. "A Study of the Transport Properties of Ethylene Carbonate-Free Li Electrolytes." Journal of The Electrochemical Society 165.3 (2018): A705. (Year: 2018).*

(Continued)

*Primary Examiner* — Maria Laios
*Assistant Examiner* — Grace Ann Kenlaw
(74) *Attorney, Agent, or Firm* — Morgan, Lewis & Bockius LLP

(57) ABSTRACT

The present disclosure provides a lithium-ion battery comprising an electrode assembly, an electrolyte and a case. The electrolyte comprises a lithium salt and an organic solvent which comprises a cyclic ester, a mass of the cyclic ester is equal to or less than 10% of a total mass of the organic solvent. A negative electrode active material at least comprises a carbon-based negative electrode material which in the negative electrode film exists in a form of a pre-lithium-intercalation compound $LiC_x$ formed by lithiation with a lithium metal, $12 \leq x \leq 150$; a capacity of the negative electrode active material per unit area/(a capacity of the positive electrode active material per unit area+a capacity of active lithium ions of the pre-lithium-intercalation compound $LiC_x$ which can be intercalated and deintercalated in the negative electrode film per unit area)$\geq 1.10$.

18 Claims, 1 Drawing Sheet

(51) Int. Cl.
    *H01M 4/133*    (2010.01)
    *H01M 4/136*    (2010.01)
    *H01M 4/58*     (2010.01)
    *H01M 4/587*    (2010.01)
    *H01M 10/42*   (2006.01)

(52) U.S. Cl.
    CPC ......... *H01M 4/587* (2013.01); *H01M 4/5825* (2013.01); *H01M 10/0525* (2013.01); *H01M 2010/4292* (2013.01); *H01M 2300/004* (2013.01)

(58) Field of Classification Search
    CPC ......... H01M 2010/4292; H01M 4/133; H01M 4/583; H01M 4/587
    See application file for complete search history.

(56) References Cited

FOREIGN PATENT DOCUMENTS

| | | |
|---|---|---|
| CN | 106663775 A | 5/2017 |
| WO | WO-2018112801 A1 | 6/2018 |
| WO | WO-2019194433 A1 | 10/2019 |

OTHER PUBLICATIONS

Contemporary Amperex Technology Co., Limited, First Office Action, CN201811068056.5, dated Aug. 28, 2020, 8 pgs.
Contemporary Amperex Technology Co., Limited, Extended European Search Report, EP19195614.3, dated Mar. 13, 2020, 9 pgs.

\* cited by examiner

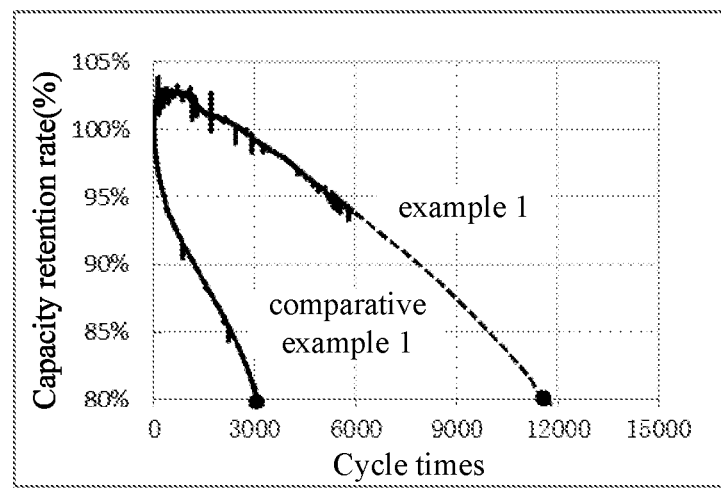

LITHIUM-ION BATTERY

CROSS-REFERENCE TO RELATED APPLICATIONS

The present application claims priority to Chinese patent application No. CN201811068056.5, filed on Sep. 13, 2018, which is incorporated herein by reference in its entirety.

FIELD OF THE PRESENT DISCLOSURE

The present disclosure relates to the field of battery, and more particularly relates to a lithium-ion battery.

BACKGROUND OF THE PRESENT DISCLOSURE

Among secondary batteries, lithium-ion batteries have a higher energy density advantage than other types of secondary batteries, which makes lithium-ion batteries dominant in the market. In the lithium-ion batteries, the lithium-ion battery using lithium iron phosphate as a positive electrode active material is widely used in the electric bus power system due to its characteristics of high safety, low cost and long life, and has a wide application prospect in the field of large-scale energy storage.

In recent years, based on the consideration for the cost of energy, the requirement for the life of lithium-ion batteries is getting higher and higher. Although lithium iron phosphate has a higher structural stability, a dissolution-repair balance of a solid electrolyte interface film (SEI film) will occur on the surface of the graphite negative electrode plate, which results in a continuous decrease of active lithium ions which can be used for transmitting between the positive electrode plate and the negative electrode plate, and thus capacity loss inevitably occurs. A lithium-ion battery using lithium titanate as a negative electrode active material and using lithium iron phosphate as a positive electrode active material can avoid the capacity loss caused by the side reaction of the negative electrode because no SEI film is formed, but a higher voltage platform of the negative electrode plate results in a lower discharge voltage platform and a too lower energy density of the lithium-ion battery and its expensive unit price leads to a higher cost per watt hour.

Therefore, effective technology is needed to solve the problem of long life of the lithium-ion battery. At present, the main means to improve the life of the lithium-ion battery are: selection of the type of lithium iron phosphate and the type of graphite with good cycle performance and storage performance, optimization of the components of the electrolyte (changing organic solvents, additives), optimization of the components of the positive electrode film and the negative electrode film, optimization of the film-forming conditions of a SEI film and the like. These means are all considered from the perspective of suppressing the side reaction of the negative electrode plate, and delay the decrease of active lithium ions by a mean of controlling current, and therefore these means have a limited effect, the longest cycle life of the lithium-ion battery may reach 5000 to 6000 times, and there is still a big gap with the target of the long-life electric bus and the large-scale energy storage system with a cycle life of 10000 or more times.

SUMMARY OF THE PRESENT DISCLOSURE

In view of the problem existing in the background, an object of the present disclosure is to provide a lithium-ion battery, which can have advantages of high energy density, long cycle life and long storage life at the same time.

In order to achieve the above object, the present disclosure provides a lithium-ion battery which comprises an electrode assembly, an electrolyte and a case. The electrolyte immerses the electrode assembly and comprises a lithium salt and an organic solvent, wherein the organic solvent in the electrolyte comprises a cyclic ester, and a mass of the cyclic ester is equal to or less than 10% of a total mass of the organic solvent in the electrolyte. The electrode assembly comprises a negative electrode plate, a positive electrode plate and a separator, wherein the negative electrode plate comprises a negative electrode collector and a negative electrode film, the negative electrode film is provided on a surface of the negative electrode collector and comprises a negative electrode active material, the positive electrode plate comprises a positive electrode collector and a positive electrode film, the positive electrode film is provided on a surface of the positive electrode collector and comprises a positive electrode active material, the separator is provided between the negative electrode plate and the positive electrode plate. Wherein the negative electrode active material at least comprises a carbon-based negative electrode material, and the carbon-based negative electrode material in the negative electrode film exists in a form of a pre-lithium-intercalation compound $LiC_x$ formed by lithiation with a lithium metal, $12 \leq x \leq 150$; a capacity of the negative electrode active material per unit area/(a capacity of the positive electrode active material per unit area+a capacity of active lithium ions of the pre-lithium-intercalation compound $LiC_x$ which can be intercalated and deintercalated in the negative electrode film per unit area)$\geq 1.10$.

Compared with the technologies in the background, the present disclosure at least includes the following beneficial effects:

(1) In the lithium-ion battery according to the present disclosure, the mass of the cyclic ester is equal to or less than 10% of the total mass of the organic solvent in the electrolyte, this may makes that the negative electrode film formation is more stable, the solvation rate and transmission rate of lithium ions are moderate, and the structural stability of the negative electrode plate is higher, so that it is beneficial to lengthen the cycle life and storage life of the lithium-ion battery.

(2) In the lithium-ion battery according to the present disclosure, by reasonably matching the relationship among the capacity of the negative electrode active material per unit area, the capacity of the positive electrode active material per unit area and the capacity of the active lithium ions of pre-lithium-intercalation compound $LiC_x$ which can be intercalated and deintercalated in the negative electrode film per unit area, after the lithium-ion battery is fully charged during the use process, the negative electrode active material may be ensured to have sufficient vacancies to receive all lithium ions deintercalated from the positive electrode active material, and after the lithium-ion battery is fully discharged, the excessive lithium ions are stored in the negative electrode plate, and in turn the capacity loss of the lithium-ion battery can be more effectively decreased, and the cycle life and the storage life of the lithium-ion battery are lengthened.

(3) The lithium-ion battery according to the present disclosure can meet the need of use for the long-life electric bus and the large-scale energy storage system with a cycle life of 10000 or more times.

BRIEF DESCRIPTION OF THE FIGURES

FIG. 1 was a graph illustrating the cycle performance of example 1 and comparative example 1 at room temperature.

DETAILED DESCRIPTION

Hereinafter, a lithium-ion battery according to the present disclosure are described in detail.

Firstly, a lithium-ion battery according to a first aspect of the present disclosure is described.

A lithium-ion battery according to a first aspect of the present disclosure comprises an electrode assembly, an electrolyte and a case.

In the lithium-ion battery according to the first aspect of the present disclosure, the electrolyte immerses the electrode assembly and comprises a lithium salt and an organic solvent, wherein, the organic solvent of the electrolyte comprises a cyclic ester, and a mass of the cyclic ester is equal to or less than 10% of a total mass of the organic solvent in the electrolyte. At this time, the negative electrode film formation is more stable, the solvation rate and the transmission rate of lithium ions are moderate, and the structural stability of the negative electrode plate is higher, which is beneficial to lengthen the cycle life and the storage life of the lithium-ion battery. Because a dielectric constant of the cyclic ester of the organic solvent is usually higher, when an amount of the cyclic ester in the organic solvent is too high, a dissociation constant of the electrolyte is higher, the solvation rate of lithium ions deintercalated from the positive electrode plate is fast, therefore the solvated lithium ions will rapidly transmit toward the surface of the negative electrode plate, a large amount of lithium ions will be rapidly intercalated into the negative electrode active material in a short time, so that the negative electrode film expands too fast, the negative electrode film gradually peels off from the negative electrode collector, and the electronic pathway between the negative electrode active material and the negative electrode collector is blocked, the loss rate of the active lithium ions in the lithium-ion battery accelerates, and in turn the lithium-ion battery is difficult to have a long cycle life.

Preferably, the mass of the cyclic ester is 0.5~9% of the total mass of the organic solvent in the electrolyte.

In the lithium-ion battery according to the first aspect of the present disclosure, the cyclic ester is one or more selected from a group consisting of cyclic carbonate, cyclic sulfate, cyclic sulfite and cyclic carboxylate. Preferably, the cyclic ester is one or more specifically selected from a group consisting of ethylene carbonate, propylene carbonate, butylene carbonate, vinylene carbonate, ethylene sulfate, ethylene sulfite, propylene sulfite and γ-butyrolactone.

In the lithium-ion battery according to the first aspect of the present disclosure, preferably, the organic solvent in the electrolyte may comprise a chain ester, preferably, the chain ester may be one or more selected from a group consisting of chain carbonate and chain carboxylate; more preferably, the chain ester may be one or more specifically selected from a group consisting of dimethyl carbonate, diethyl carbonate, ethyl methyl carbonate, methyl propyl carbonate, methyl formate, ethyl formate, methyl acetate, ethyl acetate, ethyl propionate, propyl propionate, ethyl butyrate and propyl butyrate.

More preferably, a mass ratio of the cyclic ester to the chain ester is 0.5:99~9:90.

In the lithium-ion battery according to the first aspect of the present disclosure, the organic solvent in the electrolyte may further comprise different types of ionic liquids and the like.

In the lithium-ion battery according to the first aspect of the present disclosure, the lithium salt can be an organic lithium salt or an inorganic lithium salt, specifically, the lithium salt may contain at least one of a group consisting of a fluorine element, a boron element and a phosphorus element. Preferably, the lithium salt is one or more specifically selected from a group consisting of lithium hexafluorophosphate, lithium tetrafluoroborate, lithium perchlorate, lithium hexafluoroarsenate, lithium tetrafluorooxalate, LiN$(SO_2R_F)_2$, LiN$(SO_2F)(SO_2R_F)$, bis-trifluoromethanesulfonimide, lithium bis(fluorosulfonyl)imide, lithium bis(oxalate)borate and lithium difluorooxalateborate; further preferably, the lithium salt is one or two selected from a group consisting of LiPF$_6$ and LiN$(SO_2R_F)_2$, where, the substituent $R_F$ is represented by $C_nF_{2n+1}$, and n is an integer of 1~10.

In the lithium-ion battery according to the first aspect of the present disclosure, preferably, the electrolyte may further comprise an additive, the type of the additive is not particularly limited, and may be a film-forming additive on the negative electrode film, a film-forming additive on the positive electrode film, or an additive which can improve certain performance of the battery, such as an additive which improves the overcharge performance of the battery, an additive which improves the high temperature performance of the battery, an additive which improves the low temperature performance of the battery, and the like.

In the lithium-ion battery according to the first aspect of the present disclosure, preferably, a conductivity of the electrolyte is controlled to be less than or equal to 8.5 mS/cm; more preferably, the conductivity of the electrolyte is 4 mS/cm~7 mS/cm. Due to the special film-forming process of the lithium-supplementation technology, after the electrolyte is injected into the electrode assembly, the surface of the negative electrode film immediately begins to intercalate lithium ions and forms a SEI film, by controlling the conductivity of the electrolyte, the film formation rate of the SEI film can be controlled to a certain extent, the structural stability of the SEI film can be improved, thus the cycle life and storage life of the lithium-ion battery can be better lengthened.

In the lithium-ion battery according to the first aspect of the present disclosure, the electrode assembly comprises a negative electrode plate, a positive electrode plate and a separator, wherein the negative electrode plate comprises a negative electrode collector and a negative electrode film, the negative electrode film is provided on a surface of the negative electrode collector and comprises a negative electrode active material, the positive electrode plate comprises a positive electrode collector and a positive electrode film, the positive electrode film is provided on a surface of the positive electrode collector and comprises a positive electrode active material, the separator is provided between the negative electrode plate and the positive electrode plate. Wherein the negative electrode active material at least comprises a carbon-based negative electrode material, and the carbon-based negative electrode material in the negative electrode film exists in a form of a pre-lithium-intercalation compound LiC$_x$ formed by lithiation with a lithium metal, 12≤x≤150; a capacity of the negative electrode active material per unit area/(a capacity of the positive electrode active material per unit area+a capacity of active lithium ions of the pre-lithium-intercalation compound $LiC_x$ which can be intercalated and deintercalated in the negative electrode film per unit area)≥1.10.

In the lithium-ion battery according to the first aspect of the present disclosure, in the pre-lithium-intercalation compound $LiC_x$, when x is lower than 12, the carbon-based negative electrode material has a higher degree of pre-lithium-intercalation, and the lithium metal residue is prone to occur on the surface of the negative electrode plate, causing a safety hazard; when x is larger than 150, the carbon-based negative electrode material has a lower degree of pre-lithium-intercalation, and the improvement effect on the cycle life of the lithium-ion battery is not significant. Preferably, in the pre-lithium intercalation compound $LiC_x$, 12≤x≤50.

In the lithium-ion battery according to the first aspect of the present disclosure, a capacity of the negative electrode active material per unit area/(a capacity of the positive electrode active material per unit area+a capacity of active lithium ions of the pre-lithium-intercalation compound $LiC_x$ which can be intercalated and deintercalated in the negative electrode film per unit area)≥1.10, thus after the lithium-ion battery is fully charged during the use process, the negative electrode active material can have sufficient vacancies to receive all lithium ions deintercalated from the positive electrode active material, and store excessive lithium ions in the negative electrode active material after the lithium-ion battery is fully discharged, therefore the capacity loss of the lithium-ion battery can be effectively reduced, and the cycle life and the storage life of the lithium-ion battery can be lengthened.

In order to make the lithium-ion battery better have the advantage of high energy density on a basis of the long cycle life and the long storage life, preferably, 1.2≤the capacity of the negative electrode active material per unit area/the capacity of the positive electrode active material per unit area≤2.1; more preferably, 1.3≤the capacity of the negative electrode active material per unit area/the capacity of the positive electrode active material per unit area≤2.1.

In the lithium-ion battery according to the first aspect of the present disclosure, the carbon-based negative electrode material may be one or more selected from a group consisting of natural graphite, artificial graphite, soft carbon, hard carbon, mesocarbon microbeads, nanocarbon and carbon fiber.

Besides the carbon-based negative electrode material, the negative electrode active material may further comprise one or more selected from a group consisting of a silicon-based material, a tin-based material and a lithium titanate. Wherein, preferably, the silicon-based material is one or more selected from a group consisting of an elemental silicon, a silicon oxide compound and a silicon carbon composite and a silicon alloy, the tin-based material is one or more selected from a group consisting of an elemental tin, a tin oxide compound, a tin carbon composite and a tin alloy.

In the lithium-ion battery according to the first aspect of the present disclosure, preferably, the negative electrode active material may only be a carbon-based negative electrode material; more preferably, the negative electrode active material is natural graphite, artificial graphite or a mixture thereof.

In the lithium-ion battery according to the first aspect of the present disclosure, the negative electrode film may be provided on one surface of the negative electrode collector, also may be provided on two surfaces of the negative electrode collector. The negative electrode film may further comprise a binder and a conductive agent, the type and an amount of the binder and the conductive agent are not specifically limited, and may be selected according to actual need. Preferably, the binder may be one or more selected from a group consisting of styrene butadiene rubber (SBR), sodium carboxymethyl cellulose (CMC). Preferably, the conductive agent may be one or more selected from a group consisting of conductive carbon black, superconductive carbon black, conductive graphite, acetylene black, ketjen black, graphene and carbon nanotube. The type of the negative electrode collector is also not specifically limited, and may be selected according to actual need, preferably, a copper foil may be used.

In the lithium-ion battery according to the first aspect of the present disclosure, the capacity of the negative electrode active material per unit area=a coating mass of the negative electrode plate per unit area×a mass percentage of the negative electrode active material (i.e. a mass percentage of the negative electrode active material in the negative electrode film)×a gram capacity of the negative electrode active material. That is, the capacity of the negative electrode active material per unit area is based on the capacity of the negative electrode active material (for example, a carbon-based negative electrode material) which has not been lithiated. The capacity of the positive electrode active material per unit area=a coating mass of the positive electrode plate per unit area×a mass percentage of the positive electrode active material (i.e. the mass percentage of the positive electrode active material in the positive electrode film)×a gram capacity of the positive electrode active material. Where, the gram capacities of the positive and negative electrode active materials may be tested according to the relevant national standards.

The capacity of active lithium ions of the pre-lithium-intercalation compound $LiC_x$ which can be intercalated and deintercalated in the negative electrode film per unit area can obtained by a following equation: the capacity of active lithium ions of the pre-lithium-intercalation compound $LiC_x$ which can be intercalated and deintercalated in the negative electrode film per unit area=(a capacity of active lithium ions which can be intercalated and deintercalated in the positive electrode plate per unit area+a capacity of active lithium ions which can be intercalated and deintercalated in the negative electrode plate per unit area)−a capacity of active lithium ions which can be contained in the positive electrode plate per unit area.

Specifically, the lithium-ion battery can be completely discharged and then disassembled to obtain the positive electrode plate and the negative electrode plate, and a unit area of a positive electrode plate and a unit area of a negative electrode plate are respectively cut for the following test.

The positive electrode plate per unit area and a lithium plate per unit area (as a negative electrode) are combined into a button-half battery, which is fully charged at a rate of not more than 0.1 C, and a charge capacity is obtained, that is, the capacity of active lithium ions which can be intercalated and deintercalated in the positive electrode plate per unit area; then the button-half battery is allowed to standby for a period of time (preferably not less than 5 min, further preferably 5~30 min), and then fully discharged at a rate of not more than 0.1 C (preferably the same as the charge rate) to obtain a discharge capacity, which is the capacity of active lithium ions which can be contained in the positive electrode plate per unit area.

The negative electrode plate per unit area and a lithium plate per unit area (as a negative electrode) are combined into a button-half battery, and fully charged at a rate of not more than 0.1 C to obtain a charge capacity, that is the capacity of active lithium ions which can be intercalated and deintercalated in the negative electrode plate per unit area.

It should be noted that, the cut position of the positive electrode plate and the negative electrode plate is not specifically limited, as long as it ensures that the positive electrode film and the negative electrode film fully cover the positive electrode collector and the negative electrode collector.

In the above test, the charge and discharge voltage ranges are determined according to the specific types of the positive electrode active material and the negative electrode active material, that is, are determined according to voltages recommended by the manufacturers of the positive negative electrode active material of the commercial purchase, and the charge and discharge voltages corresponding to different positive negative electrode active materials are slightly different.

In the above test, the composition of the electrolyte in the assembled button-half battery and the type of the separator are not specifically limited during selection, and it is preferable to carry out the test in the same conditions, and the change of the specific type has negligible effect on the calculated capacity of active lithium ions of the pre-lithium intercalation compound $LiC_x$ which can be intercalated and deintercalated in the negative electrode film per unit area. The composition of the electrolyte and the type of the separator film can also be prepared by referring to a national standard or industry standard.

The calculation method and the test method for the capacity of active lithium ions of the pre-lithium-intercalation compound $LiC_x$ which can be intercalated and deintercalated in the negative electrode film per unit area described above are not only applicable to the newly prepared lithium-ion battery, and also to the lithium-ion battery which has been cycled several times (in particular, the earlier cycle capacity decay is small, such as a lithium-ion battery with a capacity retention rate≥98% after the first 100 cycles).

In the lithium-ion battery according to the first aspect of the present disclosure, the positive electrode film may be provided on one surface of the positive electrode collector, also may be provided on two surfaces of the positive electrode collector. The positive electrode film further comprises a conductive agent and a binder, the types of the binder and the conductive agent are not limited, and may be selected according to actual need. Preferably, the binder specifically may be one or more selected from a group consisting of polyvinylidene fluoride (PVDF), polytetrafluoroethylene, terpolymer of vinylidene fluoride-tetrafluoroethylene-propylene, terpolymer of vinylidene fluoride-hexafluoropropylene-tetrafluoroethylene, copolymer of tetrafluoroethylene-hexafluoropropylene and fluorinated acrylate resin. Preferably, the conductive agent may be one or more selected from a group consisting of conductive carbon black, superconductive carbon black, conductive graphite, acetylene black, ketjen black, graphene and carbon nanotube. The type of the positive electrode collector is also not specifically limited, and may be selected according to actual need, preferably an aluminum foil may be used.

Wherein, the specific type of the positive electrode active material is not particularly limited, as long as it can satisfy the intercalation and deintercalation of lithium ions. The positive electrode active material may be a layered-structure material which makes lithium ions diffuse in a two-dimensional space or also a spinel-structure which makes lithium ions diffuse in a three-dimensional space. Preferably, the positive electrode active material may be one or more selected from a group consisting of a lithium transition metal oxide, a compound obtained by adding other transition metal or non-transition metal or non-metal into the lithium transition metal oxide. Specifically, the positive electrode active material may be one or more preferably selected from a group consisting of lithium cobalt oxide, lithium nickel oxide, lithium manganese oxide, lithium nickel manganese oxide, lithium nickel cobalt manganese oxide, lithium nickel cobalt aluminum oxide and olivine-type lithium-containing phosphate.

Preferably, the positive electrode active material is olivine-type lithium-containing phosphate. This is because that the olivine-type lithium-containing phosphate itself has a higher structural stability, does not cause a capacity loss due to the structural change as other positive electrode active materials in the cycle process of the lithium-ion battery, therefore the capacity decay of a lithium-ion battery using the olivine-type lithium-containing phosphate is mainly from the loss of the active lithium ions that can transmit between the positive electrode plate and the negative electrode plate inside the lithium-ion battery (for example, lithium ions are lost due to participation in the formation of the SEI film on the surface of the negative electrode plate), therefore, when the positive electrode active material is the olivine-type lithium-containing phosphate, the capacity loss of the lithium-ion battery may be further reduced, the cycle life and the storage life of the lithium-ion battery may be greatly improved.

A general formula of the olivine-type lithium-containing phosphate may be $LiFe_{1-x-y}Mn_xM'_yPO_4$, $0 \leq x \leq 1$, $0 \leq y<1$, $0 \leq x+y \leq 1$, M' is one or more selected from a group consisting of other transition metal element except for Fe and Mn or non-transition metal element, M' is one or more preferably selected from a group consisting of Cr, Mg, Ti, Al, Zn, W, Nb and Zr. Further preferably, the olivine-type lithium-containing phosphate is one or more selected from a group consisting of lithium iron phosphate, lithium manganese phosphate and lithium ferric manganese phosphate.

In the lithium-ion battery according to the first aspect of the present disclosure, the type of the separator is not specifically limited, and may be any separator material used in current lithium-ion battery, such as polyethylene, polypropylene, polyvinylidene fluoride and a multilayer composite film thereof, but not limited thereto. The separator can be used either as a bare film made of these material or as the bare film with a coating thereon, the coating varies depending on the use conditions of the separator, such as a ceramic coating or also an organic coating.

Secondly, a method for preparing a lithium-ion battery according to a second aspect of the present disclosure is described, which is used for preparing the lithium ion battery according to the first aspect of the present disclosure, comprises steps of: coating a positive electrode slurry on a surface of a positive electrode collector, and after drying, obtaining a positive electrode plate provided with a positive electrode film on the surface of the positive electrode collector; coating a negative electrode slurry on a surface of a negative electrode collector, and after drying, obtaining a negative electrode plate provided with a negative electrode film on the surface of the negative electrode collector, then providing a layer of lithium metal on a surface of the negative electrode film; and then assembling a separator, a positive electrode plate and the negative electrode plate into an electrode assembly; placing the electrode assembly into a case, injecting an electrolyte and performing packaging to obtain a finished lithium-ion battery. Wherein, after the electrode assembly is placed into the case and the electrolyte is injected, the lithium metal on the surface of the negative electrode film undergoes a rapid lithium intercalation reaction with the negative electrode active material (or a part of the negative electrode active material), and in turn the lithium metal on the surface of the negative electrode film will exist in the finished lithium-ion battery in a form of a pre-lithium-intercalated compound $LiC_x$.

In the method for preparing the lithium-ion battery according to the second aspect of the present disclosure, preferably, a mass of the lithium metal may be 0.5~5% of a total mass of the negative electrode film. The higher the mass of the lithium metal, the more easily the lithium is precipitated on the negative electrode plate.

In the method for preparing the lithium-ion battery according to the second aspect of the present disclosure, the source and the shape of the layer of lithium metal provided on the surface of the negative electrode film are not limited. The source of the lithium metal is one or more selected from a group consisting of a powder-form lithium and a plate-form lithium. When the lithium metal is a powder-form lithium, usually the powder-form lithium may be uniformly distributed on the surface of the negative electrode film by vibrating, then the powder-form lithium is adhered on the surface of the negative electrode film by cold pressing of a roll pair to form a layer of lithium metal. When the lithium metal is a plate-form lithium, usually a thicker lithium plate is sufficiently plastically formed to a thinner lithium plate and then uniformly laid on the surface of the negative electrode film, then the lithium plate is adhered onto the surface of the negative electrode film by cold pressing of a roll pair to form a layer of lithium metal, the thicker lithium plate may sufficiently control the actual thickness of the lithium plate after fully plastic formed, and in turn accurately control the mass of the lithium supplementation.

In the method for preparing the lithium-ion battery according to the second aspect of the present disclosure, the layer of lithium metal provided on the surface of the negative electrode film is not necessarily densely and uniformly distributed on the surface of the negative electrode film. For example, when the lithium metal is a powder-form lithium, there may be a certain gap among the powder-form lithium particles on the surface of the negative electrode film, a size of the gap may be controlled within 1 μm~5000 μm. When the lithium metal is a plate-form lithium, a plurality of lithium plates (or lithium strips) also may be intermittently cover the surface of the negative electrode film with an interval therebetween, the interval between the lithium plates (or lithium strips) may be controlled within 1 μm~5000 μm, after the electrolyte is injected, after a long period of infiltration and diffusion, the lithium in the lithium-rich region (at the position of lithium plates or lithium strips) will diffuse into the non-lithium-rich region (at the position of the interval), finally the lithium content of the negative electrode film still may achieve uniformity.

Hereinafter the present disclosure will be described in detail in combination with examples. It should be noted that, the examples described in the present disclosure are only used for explaining the present disclosure, and are not intended to limit the scope of the present disclosure.

Example 1

(1) Preparation of a Positive Electrode Plate

Lithium iron phosphate (positive electrode active material, the gram capacity was 139 mAh/g), acetylene black (conductive agent), PVDF (binder) at a mass ratio of 94:4:2 were uniformly mixed with N-methylpyrrolidone (NMP, solvent), and a positive electrode slurry was obtained, then the positive electrode slurry was uniformly coated on two surfaces of an aluminum foil (positive electrode collector), and the positive electrode plate was obtained after drying and cold-pressing. Where, the coating mass of the positive electrode slurry was 0.198 g/1540.25 mm² (the coating mass was based on the mass of the solid component without the solvent).

(2) Preparation of a Negative Electrode Plate

Artificial graphite (negative electrode active material, the gram capacity was 340 mAh/g), acetylene black (conductive agent), SBR (a binder) and CMC at a mass ratio of 95:1.5:3.1:0.4 were uniformly mixed with deionized water (solvent) and a negative electrode slurry was obtained, then the negative electrode slurry was uniformly coated on two surfaces of a copper foil (negative electrode collector), and the negative electrode plate was obtained after drying and cold-pressing, then the lithium plate (theoretical gram capacity was 3861.3 mAh/g) was provided on the surface of the negative electrode film by rolling method, and the negative electrode plate was obtained. Where, the coating mass of the negative electrode slurry was 0.120 g/1540.25 mm² (the coating mass was based on the mass of the solid component without the solvent), and the mass of the lithium plate was 3.05 mg/1540.25 mm².

(3) Preparation of an Electrolyte

In an argon atmosphere glove box with a water content <10 μm, ethylene carbonate (EC), propylene carbonate (PC) and ethyl methyl carbonate (EMC) at a mass ratio of EC:PC:EMC=5:3:90 were mixed to obtain an organic solvent, then the fully dried $LiPF_6$ (lithium salt) was dissolved in the above organic solvent and stirred uniformly, an electrolyte was obtained, where, the concentration of the $LiPF_6$ was 1 mol/L.

(4) Preparation of a Separator

A polyethylene porous film with a thickness of 20 μm was selected as a separator.

(5) Preparation of a Lithium-Ion Battery

The positive electrode plate, the separator and the negative electrode plate were stacked in order, making the separator between the positive electrode plate and the negative electrode plate to function as separation, and then wound into an electrode assembly, and then the electrode assembly was placed into a case, packaged after the prepared electrolyte was injected, and a finished lithium-ion battery was obtained.

Where, the capacity of the negative electrode active material per unit area (calculated with an area of 1540.25 mm², the following examples were the same)=the coating mass of the negative electrode per unit area×the mass percentage of the negative electrode active material×the gram capacity of the negative electrode active material=0.120 g×95%×340 mAh/g=38.76 mAh.

The capacity of the positive electrode active material per unit area (calculated with an area of 1540.25 mm², the following examples were the same)=the coating mass of the positive electrode per unit area×the mass percentage of the positive electrode active material×the gram capacity of the positive electrode active material=0.198 g×94%×139 mAh/g=25.87 mAh.

Example 2

The preparation of the lithium-ion battery was the same as example 1, except that in the preparation of an electrolyte (step (3)), in an argon atmosphere glove box with a water content <10 μm, ethylene carbonate (EC), propylene carbonate (PC) and ethyl methyl carbonate (EMC) at a mass ratio of EC:PC:EMC=3:5:90 were mixed to obtain an organic solvent, then the fully dried $LiPF_6$ (lithium salt) was dissolved in the above organic solvent and stirred uniformly, an electrolyte was obtained, where, the concentration of the $LiPF_6$ was 1 mol/L.

Example 3

The preparation of the lithium-ion battery was the same as example 1, except that in the preparation of an electrolyte (step (3)), in an argon atmosphere glove box with a water content <10 μm, ethylene carbonate (EC), propylene carbonate (PC) and ethyl methyl carbonate (EMC) at a mass ratio of EC:PC:EMC=1:1:96 were mixed to obtain an organic solvent, then the fully dried $LiPF_6$ (lithium salt) was dissolved in the above organic solvent and stirred uniformly, an electrolyte was obtained, where, the concentration of the $LiPF_6$ was 1 mol/L.

Comparative Example 1

The preparation of the lithium-ion battery was the same as example 1, except that in the preparation of an electrolyte (step (3)), in an argon atmosphere glove box with a water content <10 μm, ethylene carbonate (EC), propylene carbonate (PC) and ethyl methyl carbonate (EMC) at a mass ratio of EC:PC:EMC=15:35:48 were mixed to obtain an organic solvent, then the fully dried $LiPF_6$ (lithium salt) was dissolved in the above organic solvent and stirred uniformly, an electrolyte was obtained, where, the concentration of the $LiPF_6$ was 1 mol/L.

Comparative Example 2

The preparation of the lithium-ion battery was the same as example 1, except that in the preparation of an electrolyte (step (3)), in an argon atmosphere glove box with a water content <10 μm, ethylene carbonate (EC), propylene carbonate (PC) and ethyl methyl carbonate (EMC) at a mass ratio of EC:PC:EMC=10:40:48 were mixed to obtain an organic solvent, then the fully dried $LiPF_6$ (lithium salt) was dissolved in the above organic solvent and stirred uniformly, an electrolyte was obtained, where, the concentration of the $LiPF_6$ was 1 mol/L.

Next test processes of the lithium-ion battery were described.

(1) Test of cycle performance of the lithium-ion battery at room temperature

At 25° C., the finished lithium-ion battery prepared in example 1 and comparative example 1 was fully discharged at a nominal rate of 1 C (i.e. a current value that a theoretical capacity was completely discharged within 1 h), then the test was started. The test process was: the lithium-ion battery was charged to a voltage of 3.65V at a constant current of 1 C, and charged to a current of 0.05 C at a constant voltage of 3.65V, after standby was performed for 5 min, the lithium-ion battery was discharged to a voltage of 2.5V at a constant current of 1 C, this was a cycle process of charging and discharging, the discharge capacity at this time was taken as the discharge capacity of the first cycle. The lithium-ion battery was performed for multiple cycles of the charging and discharging test method according to the above method until the discharge capacity of the lithium-ion battery was decayed to 80%, and the number of cycles of the lithium-ion battery was recorded.

(2) Test of Cycle Performance of the Lithium-Ion Battery at High Temperature

At 60° C., the finished lithium-ion batteries prepared in examples and comparative examples was fully discharged at a nominal rate of 1 C, then the test was started. The test process was: the lithium-ion battery was charged to a voltage of 3.65V at a constant current of 1 C, and charged to a current of 0.05 C at a constant voltage of 3.65V, after standby was performed for 5 min, the lithium-ion battery was discharged to a voltage of 2.5V at a constant current of 1 C, this was a cycle process of charging and discharging, the discharge capacity at this time was taken as the discharge capacity of the first cycle. The lithium-ion battery was performed for multiple cycles of the charging and discharging test method according to the above method, the discharge capacity at the 500th cycle was detected and obtained.

The capacity retention rate of the lithium-ion battery after cycled for 500 times at 60° C.=(the discharge capacity of the 500th cycle/the discharge capacity of the first cycle)×100%.

(3) Test of Storage Performance of the Lithium-Ion Battery at High Temperature

Firstly, at 25° C., the finished lithium-ion battery prepared in examples and comparative examples were fully discharged at a nominal rate of 1 C, then the test was started. The test process was: the lithium-ion battery was charged to a voltage of 3.65V at a constant current of 0.5 C, and charged to a current of 0.05 C at a constant voltage of 3.65V, after standby was performed for 5 min, the lithium-ion battery was discharged to a voltage of 2.5V at a constant current of 0.5 C, the discharge capacity at this time was the discharge capacity before storage; then the lithium-ion battery was fully charged at a current of 0.5 C, and standby was performed in an environment of 60° C. for 90 days, then taken out, and placed in an environment of 25° C. and standby was performed for 2 h, then the lithium-ion battery was discharged to a voltage of 2.5V at a constant current of 0.5 C, charged to a voltage of 3.65V at a constant current of 0.5 C after standby was performed for 5 min, and then charged to a current of 0.05 C at a constant voltage of 3.65V, discharged to a voltage of 2.5V at a constant current of 0.5 C after standby was performed for 5 min, the discharge capacity at this time was the discharge capacity after stored for 90 days.

The capacity retention rate of the lithium-ion battery after stored at 60° C. for 90 days=(the discharge capacity after stored 90 days/the discharge capacity before storage)×100%.

TABLE 1

Test results of performances of examples 1-3 and comparative examples 1-2

|  | Conductivity of electrolyte (mS/cm) | Capacity retention rate after cycled for 500 times at 60° C. | Capacity retention rate after stored for 90 days at 60° C. |
|---|---|---|---|
| Example 1 | 5.2 | 103.6% | 98.4% |
| Example 2 | 5.0 | 102.7% | 97.2% |
| Example 3 | 2.2 | 100.9% | 96.3% |
| Comparative Example 1 | 9.1 | 93.5% | 88.9% |
| Comparative Example 2 | 8.9 | 92.1% | 89.1% |

FIG. 1 was a graph illustrating the cycle performances of example 1 and comparative example 1 at room temperature. As could be seen from FIG. 1, the lithium-ion battery of comparative example 1 was expected to cycle about 3,000 times at most when the capacity was decayed to 80% at room temperature, however, the lithium-ion battery of example 1 still had 94% reversible discharge capacity after cycled for 6,000 times, and was expected to cycle about 12,000 times when the capacity was decayed to 80%, therefore, it could meet the need of use for long-life electric buses and large-scale energy storage systems. In comparative example 1, the content of the cyclic ester in the organic solvent was too high, the conductivity of the electrolyte was high, and the dissociation constant was high, after the electrolyte was injected, lithium metal on the negative electrode plate was intercalated into the graphite layer in a large amount, thereby making the graphite have a large volume expansion after the first lithium intercalation; in addition, during the subsequent cycle in use of the battery, because the dissociation constant of the electrolyte was high, the solvation rate of lithium ions deintercalated from the positive electrode plate was too fast, the solvated lithium ions rapidly transmitted to the surface of the graphite, a large amount of lithium ions were rapidly intercalated into the graphite in a short time, as a result, the negative electrode film expanded too fast, and the negative electrode film gradually peeled off from the negative electrode collector, which blocked the electronic pathway between the graphite and the negative electrode collector and accelerated the loss rate of the active lithium ions, so the lithium-ion battery was difficult to have a long cycle life.

As could be seen from the comparison of comparative examples 1-2, under the condition that the content of cyclic ester in the electrolyte was constant, changing the relative content of EC and PC in the cyclic ester had little effect on the cycle performance and storage performance of the lithium-ion battery.

As could be seen from the comparison of comparative examples 1-3, controlling the content of the cyclic ester in the organic solvent to be or less than 10% might effectively improve the cycle performance and storage performance of the lithium ion battery.

The lithium-ion batteries in examples 1-3 and comparative examples 3-9 were prepared in the same method as example 1 except the differences as follows:

Example 4

The coating mass of the negative electrode slurry was 0.136 g/1540.25 mm$^2$, the coating mass of the positive electrode slurry was 0.198 g/1540.25 mm$^2$, the mass of the lithium plate provided on the surface of the negative electrode film was 3.05 mg/1540.25 mm$^2$. The capacity of the negative electrode active material per unit area=0.136 g×95%×340 mAh/g=43.93 mAh. The capacity of the positive electrode active material per unit area=0.198 g×94%× 139 mAh/g=25.87 mAh.

Example 5

The coating mass of the negative electrode slurry was 0.104 g/1540.25 mm$^2$, the coating mass of the positive electrode slurry was 0.198 g/1540.25 mm$^2$, the mass of the lithium plate provided on the surface of the negative electrode film was 1.52 mg/1540.25 mm$^2$. The capacity of the negative electrode active material per unit area=0.104 g×95%×340 mAh/g=33.59 mAh. The capacity of the positive electrode active material per unit area=0.198 g×94%× 139 mAh/g=25.87 mAh.

Example 6

The coating mass of the negative electrode slurry was 0.136 g/1540.25 mm$^2$, the coating mass of the positive electrode slurry was 0.224 g/1540.25 mm$^2$, the mass of the lithium plate provided on the surface of the negative electrode film was 3.45 mg/1540.25 mm$^2$. The capacity of the negative electrode active material per unit area=0.136 g×95%×340 mAh/g=43.93 mAh. The capacity of the positive electrode active material per unit area=0.224 g×94%× 139 mAh/g=29.27 mAh.

Example 7

The coating mass of the negative electrode slurry was 0.136 g/1540.25 mm$^2$, the coating mass of the positive electrode slurry was 0.198 g/1540.25 mm$^2$, the mass of the lithium plate provided on the surface of the negative electrode film was 3.45 mg/1540.25 mm$^2$. The capacity of the negative electrode active material per unit area=0.136 g×95%×340 mAh/g=43.93 mAh. The capacity of the positive electrode active material per unit area=0.198 g×94%× 139 mAh/g=25.87 mAh.

Example 8

The coating mass of the negative electrode slurry was 0.136 g/1540.25 mm$^2$, the coating mass of the positive electrode slurry was 0.177 g/1540.25 mm$^2$, the mass of the lithium plate provided on the surface of the negative electrode film was 3.45 mg/1540.25 mm$^2$. The capacity of the negative electrode active material per unit area=0.136 g×95%×340 mAh/g=43.93 mAh. The capacity of the positive electrode active material per unit area=0.177 g×94%× 139 mAh/g=23.13 mAh.

Example 9

The coating mass of the negative electrode slurry was 0.136 g/1540.25 mm$^2$, the coating mass of the positive electrode slurry was 0.259 g/1540.25 mm$^2$, the mass of the lithium plate provided on the surface of the negative electrode film was 1.99 mg/1540.25 mm$^2$. The capacity of the negative electrode active material per unit area=0.136 g×95%×340 mAh/g=43.93 mAh. The capacity of the positive electrode active material per unit area=0.259 g×94%× 139 mAh/g=33.84 mAh.

Example 10

The coating mass of the negative electrode slurry was 0.136 g/1540.25 mm$^2$, the coating mass of the positive electrode slurry was 0.177 g/1540.25 mm$^2$, the mass of the lithium plate provided on the surface of the negative electrode film was 5.44 mg/1540.25 mm$^2$. The capacity of the negative electrode active material per unit area=0.136 g×95%×340 mAh/g=4.3.93 mAh. The capacity of the positive electrode active material per unit area=0.177 g×94%× 139 mAh/g=23.13 mAh.

Example 11

The coating mass of the negative electrode slurry was 0.136 g/1540.25 mm$^2$, the coating mass of the positive electrode slurry was 0.160 g/1540.25 mm$^2$, the mass of the lithium plate provided on the surface of the negative electrode film was 6.16 mg/1540.25 mm$^2$. The capacity of the negative electrode active material per unit area=0.136 g×95%×340 mAh/g=43.93 mAh. The capacity of the positive electrode active material per unit area=0.160 g×94%× 139 mAh/g=20.91 mAh.

Example 12

The coating mass of the negative electrode slurry was 0.136 g/1540.25 mm², the coating mass of the positive electrode slurry was 0.280 g/1540.25 mm², the mass of the lithium plate provided on the surface of the negative electrode film was 1.10 mg/1540.25 mm². The capacity of the negative electrode active material per unit area=0.136 g×95%×340 mAh/g=43.93 mAh. The capacity of the positive electrode active material per unit area=0.280 g×94%× 139 mAh/g=36.58 mAh.

Example 13

The coating mass of the negative electrode slurry was 0.136 g/1540.25 mm², the coating mass of the positive electrode slurry was 0.280 g/1540.25 mm², the mass of the lithium plate provided on the surface of the negative electrode film was 0.68 mg/1540.25 mm². The capacity of the negative electrode active material per unit area=0.136 g×95%×340 mAh/g=43.93 mAh. The capacity of the positive electrode active material per unit area=0.280 g×94%× 139 mAh/g=36.58 mAh.

Comparative Example 3

No lithium plate was provided on the surface of the negative electrode film, the coating mass of the negative electrode slurry was 0.120 g/1540.25 mm², the coating mass of the positive electrode slurry was 0.198 g/1540.25 mm². The capacity of the negative electrode active material per unit area=0.120 g×95%×340 mAh/g=38.76 mAh. The capacity of the positive electrode active material per unit area=0.198 g×94%×139 mAh/g=25.87 mAh.

Comparative Example 4

No lithium plate was provided on the surface of the negative electrode film, the coating mass of the negative electrode slurry was 0.094 g/1540.25 mm², the coating mass of the positive electrode slurry was 0.198 g/1540.25 mm². The capacity of the negative electrode active material per unit area=0.094 g×95%×340 mAh/g=30.36 mAh. The capacity of the positive electrode active material per unit area=0.198 g×94%×139 mAh/g=25.87 mAh.

Comparative Example 5

No lithium plate was provided on the surface of the negative electrode film, the coating mass of the negative electrode slurry was 0.136 g/1540.25 mm², the coating mass of the positive electrode slurry was 0.224 g/1540.25 mm². The capacity of the negative electrode active material per unit area=0.136 g×95%×340 mAh/g=43.93 mAh. The capacity of the positive electrode active material per unit area=0.224 g×94%×139 mAh/g=29.27 mAh.

Comparative Example 6

No lithium plate was provided on the surface of the negative electrode film, the coating mass of the negative electrode slurry was 0.136 g/1540.25 mm², the coating mass of the positive electrode slurry was 0.287 g/1540.25 mm². The capacity of the negative electrode active material per unit area=0.136 g×95%×340 mAh/g=43.93 mAh. The capacity of the positive electrode active material per unit area=0.287 g×94%×139 mAh/g=37.50 mAh.

Comparative Example 7

The coating mass of the negative electrode slurry was 0.136 g/1540.25 mm², the coating mass of the positive electrode slurry was 0.280 g/1540.25 mm², the mass of the lithium plate provided on the surface of the negative electrode film was 1.99 mg/1540.25 mm². The capacity of the negative electrode active material per unit area=0.136 g×95%×340 mAh/g=43.93 mAh. The capacity of the positive electrode active material per unit area=0.280 g×94%× 139 mAh/g=36.58 mAh.

Comparative Example 8

The coating mass of the negative electrode slurry was 0.104 g/1540.25 mm², the coating mass of the positive electrode slurry was 0.198 g/1540.25 mm², the mass of the lithium plate provided on the surface of the negative electrode film was 3.05 mg/1540.25 mm². The capacity of the negative electrode active material per unit area=0.104 g×95%×340 mAh/g=33.59 mAh. The capacity of the positive electrode active material per unit area=0.198 g×94%× 139 mAh/g=25.87 mAh.

Comparative Example 9

The coating mass of the negative electrode slurry was 0.136 g/1540.25 mm², the coating mass of the positive electrode slurry was 0.287 g/1540.25 mm², the mass of the lithium plate provided on the surface of the negative electrode film was 3.45 mg/1540.25 mm². The capacity of the negative electrode active material per unit area=0.136 g×95%×340 mAh/g=43.93 mAh. The capacity of the positive electrode active material per unit area=0.287 g×94%× 139 mAh/g=37.50 mAh.

In examples 4-13 and comparative examples 3-9:

(1) Test capacity of active lithium ions of the pre-lithium-intercalation compound $LiC_x$ which could be intercalated and deintercalated in the negative electrode film per unit area The finished lithium-ion battery prepared in examples and comparative examples were fully discharged at a nominal rate of 1 C, then disassembled to obtain a positive electrode plate and a negative electrode plate, a unit area of positive electrode plate and a unit area of negative electrode plate were respectively cut for test.

The cut unit area of the positive electrode plate, the electrolyte (the same as example 1), the separator (the same as example 1) and the unit area of lithium plate (as a negative electrode) were combined into a button-half battery, the button-half battery was fully charged to 3.75V at a rate of 0.1 C and a charge capacity was obtained, that was, capacity of active lithium ions which could be intercalated and deintercalated in the positive electrode plate per unit area. Then the button-half battery was allowed to standby for 30 min, and then fully discharged to 2.0V at a rate of 0.1 C and a discharge capacity was obtained, that was, the capacity of active lithium ions which could be contained in the positive electrode plate per unit area.

The cut unit area of the negative electrode plate, the electrolyte (the same as example 1), the separator (the same as example 1) and the unit area of lithium plate (as a negative electrode) were combined into a button-half battery, the button-half battery was fully charged to 1.0V at a rate of 0.1 C and a charge capacity was obtained, that was, the capacity of active lithium ions which could be intercalated and deintercalated in the negative electrode plate per unit area.

The sum of the capacity of active lithium ions which could be intercalated and deintercalated in the positive electrode plate per unit area and the capacity of active lithium ions which could be intercalated and deintercalated in the negative electrode plate per unit area minus the capacity of active lithium ions which could be contained in the positive electrode plate per unit area was the capacity of active lithium ions of the pre-lithium-intercalation compound $LiC_x$ which could be intercalated and deintercalated in the negative electrode film per unit area.

(2) Calculation method of x in $LiC_x$ x=(the capacity of the negative electrode active material per unit area/the gram capacity of the graphite/the molar mass of the graphite)/(the capacity of active lithium ions of $LiC_x$ which could be intercalated and deintercalated in the negative electrode film per unit area/the theoretical gram capacity of lithium metal/the molar mass of lithium metal).

TABLE 3

Test results of performance of examples 4-13 and comparative examples 3-9

| | Capacity retention rate after cycled for 500 times at 60° C. | Capacity retention rate after stored for 90 days at 60° C. |
|---|---|---|
| Comparative Example 3 | 86.9% | 84.8% |
| Comparative Example 4 | 84.6% | 85.1% |
| Comparative Example 5 | 85.6% | 84.7% |
| Comparative Example 6 | 85.5% | 85.7% |
| Comparative Example 7 | N/A (diving) | N/A (diving) |

TABLE 2

Parameters of examples 4-13 and comparative examples 3-9

| | $LiC_x$ | Capacity of active lithium ions which could be intercalated and deintercalated in the positive electrode plate per unit area (mAh) | Capacity of active lithium ions which could be intercalated and deintercalated in the negative electrode plate per unit area (mAh) | Capacity of active lithium ions which could be contained in the positive electrode plate per unit area (mAh) | Capacity of active lithium ions of $LiC_x$ could be intercalated and deintercalated in the negative electrode film per unit area (mAh) |
|---|---|---|---|---|---|
| Comparative Example 3 | / | 27.55 | 0 | 27.68 | / |
| Comparative Example 4 | / | 27.55 | 0 | 27.68 | / |
| Comparative Example 5 | / | 31.17 | 0 | 31.32 | / |
| Comparative Example 6 | / | 39.93 | 0 | 40.13 | / |
| Comparative Example 7 | $LiC_{48}$ | 38.95 | 6.15 | 39.14 | 5.95 |
| Comparative Example 8 | $LiC_{24}$ | 27.55 | 9.42 | 27.68 | 9.28 |
| Comparative Example 9 | $LiC_{27}$ | 39.93 | 10.66 | 40.13 | 10.46 |
| Example 4 | $LiC_{31}$ | 27.55 | 9.42 | 27.68 | 9.28 |
| Example 5 | $LiC_{48}$ | 27.55 | 4.70 | 27.68 | 4.56 |
| Example 6 | $LiC_{27}$ | 31.17 | 10.66 | 31.32 | 10.50 |
| Example 7 | $LiC_{27}$ | 27.55 | 10.66 | 27.68 | 10.52 |
| Example 8 | $LiC_{27}$ | 24.63 | 10.66 | 24.75 | 10.54 |
| Example 9 | $LiC_{48}$ | 36.03 | 6.15 | 36.21 | 5.97 |
| Example 10 | $LiC_{17}$ | 24.63 | 16.81 | 24.75 | 16.68 |
| Example 11 | $LiC_{15}$ | 22.26 | 19.03 | 22.38 | 18.92 |
| Example 12 | $LiC_{90}$ | 38.95 | 3.40 | 39.14 | 3.20 |
| Example 13 | $LiC_{150}$ | 38.95 | 2.10 | 39.14 | 1.91 |

| | Capacity of the negative electrode active material per unit area (mAh) | Capacity of the positive electrode active material per unit area (mAh) | Equation 1 | Equation 2 |
|---|---|---|---|---|
| Comparative Example 3 | 38.76 | 25.87 | 1.50 | 1.50 |
| Comparative Example 4 | 30.36 | 25.87 | 1.17 | 1.17 |
| Comparative Example 5 | 43.93 | 29.27 | 1.50 | 1.50 |
| Comparative Example 6 | 43.93 | 37.50 | 1.17 | 1.17 |
| Comparative Example 7 | 43.93 | 36.58 | 1.20 | 1.03 |
| Comparative Example 8 | 33.59 | 25.87 | 1.30 | 0.96 |
| Comparative Example 9 | 43.93 | 37.50 | 1.17 | 0.92 |
| Example 4 | 43.93 | 25.87 | 1.70 | 1.25 |
| Example 5 | 33.59 | 25.87 | 1.30 | 1.10 |
| Example 6 | 43.93 | 29.27 | 1.50 | 1.10 |
| Example 7 | 43.93 | 25.87 | 1.70 | 1.21 |
| Example 8 | 43.93 | 23.13 | 1.90 | 1.30 |
| Example 9 | 43.93 | 33.84 | 1.30 | 1.10 |
| Example 10 | 43.93 | 23.13 | 1.90 | 1.10 |
| Example 11 | 43.93 | 20.91 | 2.10 | 1.10 |
| Example 12 | 43.93 | 36.58 | 1.20 | 1.10 |
| Example 13 | 43.93 | 36.58 | 1.20 | 1.14 |

Note:
Unit area was calculated with an area of 1540.25 $mm^2$.
Equation 1 = capacity of the negative electrode active material per unit area/capacity of the positive electrode active material per unit area.
Equation 2 = capacity of the negative electrode active material per unit area/(capacity of the positive electrode active material per unit area + capacity of active lithium ions of the pre-lithium-intercalation compound $LiC_x$ which could be intercalated and deintercalated in the negative electrode film per unit area).

TABLE 3-continued

Test results of performance of examples 4-13 and comparative examples 3-9

|  | Capacity retention rate after cycled for 500 times at 60° C. | Capacity retention rate after stored for 90 days at 60° C. |
| --- | --- | --- |
| Comparative Example 8 | N/A (diving) | N/A (diving) |
| Comparative Example 9 | N/A (diving) | N/A (diving) |
| Example 4 | 98.0% | 98.1% |
| Example 5 | 91.0% | 92.3% |
| Example 6 | 98.0% | 97.3% |
| Example 7 | 97.4% | 97.8% |
| Example 8 | 97.1% | 98.1% |
| Example 9 | 90.1% | 91.2% |
| Example 10 | 101.0% | 102.2% |
| Example 11 | 101.1% | 102.4% |
| Example 12 | 88.4% | 88.7% |
| Example 13 | 87.2% | 86.2% |

As could be seen from the comparison of the test results of comparative examples 3-4, under the condition that the capacity of the positive electrode active material per unit area was constant, increasing the coating mass of the negative electrode slurry and in turn increasing the capacity of the negative electrode active material per unit area had little effect on the cycle performance and storage performance of the lithium-ion battery, and it was still difficult to meet the need for use. As could be seen from the comparison of comparative examples 5-6, under the condition that the capacity of the negative electrode active material per unit area was constant, decreasing the coating mass of the positive electrode slurry and in turn decreasing the capacity of the positive electrode active material per unit area had little effect on the cycle performance and storage performance of the lithium-ion battery. As could be seen from the comparison of the test results of examples 4-9, after a layer of lithium metal was provided on the surface of the negative electrode film, the cycle performance and the storage performance of the lithium-ion battery were significantly improved. This indicated that it was difficult to obtain a lithium ion battery with both excellent cycle performance and excellent storage performance only considering from the ratio of the capacity of the negative electrode active material per unit area to the capacity of the positive electrode active material per unit area, however, after a layer of lithium metal was provided on the surface of the negative electrode film, the cycle performance and storage performance of the lithium-ion battery were significantly improved.

In comparative examples 7-9, the ratio of equation 2 was too low, the cycle performance and storage performance of the lithium-ion battery were still worse, this was because the ratio was too low, the capacity of the positive electrode active material per unit area and the capacity of the negative electrode active material per unit area did not match the capacity of active lithium ions of pre-lithium-intercalation compound $LiC_x$ which could be intercalated and deintercalated in the negative electrode film per unit area, after the lithium-ion battery was fully charged, the negative electrode active material had not sufficient vacancies to receive all lithium ions deintercalated from the positive electrode active material, causing precipitation of lithium on the negative electrode plate, and the lithium-ion battery was prone to generate gas and leak electrolyte, and then the cycle performance and storage performance of the lithium-ion battery became very poor. This indicated that the content of lithium metal provided on the surface of the negative electrode film should ensure that the capacity of active lithium ions of pre-lithium-intercalation compound $LiC_x$ which could be intercalated and deintercalated in the negative electrode film per unit area was reasonably matched with the capacity of the positive electrode active material per unit area and the capacity of the negative electrode active material per unit area.

According to the disclosure and teach of the above description, the skilled in the art may also make appropriate changes and modifications to the above embodiments. Therefore, the present disclosure is not limited to the specific implementation manners disclosed and described as above, some modifications and changes of the present disclosure are also intended to fall within the scope of the claims. In addition, although some specific terms were used in the present disclosure, but they were used only to describe conveniently, and does not constitute any limitation to the present disclosure.

What is claimed is:

1. A lithium-ion battery, comprising: an electrode assembly; an electrolyte immersing the electrode assembly and comprising a lithium salt and an organic solvent; and a case;
wherein the electrode assembly comprises:
a negative electrode plate comprising a negative electrode collector and a negative electrode film, the negative electrode film is provided on a surface of the negative electrode collector and comprises a negative electrode active material;
a positive electrode plate comprising a positive electrode collector and a positive electrode film, the positive electrode film is provided on a surface of the positive electrode collector and comprises a positive electrode active material; and
a separator provided between the negative electrode plate and the positive electrode plate;
wherein
the negative electrode active material at least comprises a carbon-based negative electrode material, and the carbon-based negative electrode material in the negative electrode film exists in a form of a pre-lithium-intercalation compound $LiC_x$ formed by lithiation with a lithium metal, $12 \leq x \leq 150$;
a capacity of the negative electrode active material per unit area/(a capacity of the positive electrode active material per unit area+a capacity of active lithium ions of the pre-lithium-intercalation compound $LiC_x$ which can be intercalated and deintercalated in the negative electrode film per unit area)$\geq 1.10$;
the organic solvent in the electrolyte comprises a cyclic ester, and a mass of the cyclic ester is equal to or less than 10% of a total mass of the organic solvent in the electrolyte; and
$1.2 \geq$ the capacity of the negative electrode active material per unit area/the capacity of the positive electrode active material per unit area$\leq 2.1$.

2. The lithium-ion battery according to claim 1, wherein the mass of the cyclic ester is 0.5%~9% of the total mass of the organic solvent in the electrolyte.

3. The lithium-ion battery according to claim 1, wherein $12 \leq x \leq 50$.

4. The lithium-ion battery according to claim 1, wherein the cyclic ester is one or more selected from a group consisting of cyclic carbonate, cyclic sulfate, cyclic sulfite and cyclic carboxylate.

5. The lithium-ion battery according to claim 4, wherein the cyclic ester is one or more selected from a group consisting of ethylene carbonate, propylene carbonate, butylene carbonate, vinylene carbonate, ethylene sulfate, ethylene sulfite, propylene sulfite and γ- butyrolactone.

6. The lithium-ion battery according to claim 1, wherein the organic solvent in the electrolyte also comprises a chain ester.

7. The lithium-ion battery according to claim 6, wherein a mass ratio of the cyclic ester to the chain ester is 0.5: 99~9:90.

8. The lithium-ion battery according to claim 6, wherein the chain ester is one or more selected from a group consisting of a chain carbonate and a chain carboxylate.

9. The lithium-ion battery according to claim 8, wherein the chain ester is one or more selected from a group consisting of dimethyl carbonate, diethyl carbonate, ethyl methyl carbonate, methyl propyl carbonate, methyl formate, ethyl formate, methyl acetate, ethyl acetate, ethyl propionate, propyl propionate, ethyl butyrate and propyl butyrate.

10. The lithium-ion battery according to claim 1, wherein a conductivity of the electrolyte is less than or equal to 8.5 mS/cm.

11. The lithium-ion battery according to claim 10, wherein the conductivity of the electrolyte is 4 mS/cm~7 mS/cm.

12. The lithium-ion battery according to claim 1, wherein the carbon-based negative electrode material is one or more selected from a group consisting of natural graphite, artificial graphite, soft carbon, hard carbon, mesocarbon microbeads, nanocarbon and carbon fiber.

13. The lithium-ion battery according to claim 1, wherein the negative electrode active material further comprises one or more selected from a group consisting of a silicon-based material, a tin-based material and a lithium titanate.

14. The lithium-ion battery according to claim 1, wherein the negative electrode active material is a carbon-based negative electrode material.

15. The lithium-ion battery according to claim 14, wherein the negative electrode active material is natural graphite, artificial graphite or a mixture thereof.

16. The lithium-ion battery according to claim 1, wherein the positive electrode active material is one or more selected from a group consisting of lithium cobalt oxide, lithium nickel oxide, lithium manganese oxide, lithium nickel manganese oxide, lithium nickel cobalt manganese oxide, lithium nickel cobalt aluminum oxide and olivine-type lithium-containing phosphate.

17. The lithium-ion battery according to claim 16, wherein the positive electrode active material is olivine-type lithium-containing phosphate.

18. The lithium-ion battery according to claim 1, wherein $1.3 \leq$ the capacity of the negative electrode active material per unit area/the capacity of the positive electrode active material per unit area $\leq 2.1$.

* * * * *